United States Patent
Eppich (10) Patent No.: US 8,444,409 B2
(45) Date of Patent: May 21, 2013

(54) EJECTOR APPARATUS WITH ADDITIONAL EJECTOR FORCE

(75) Inventor: Stefan Eppich, Arbing (AT)

(73) Assignee: Engel Austria GmbH, Schwertberg (AU)

( * ) Notice: Subject to any disclaimer, the term of this patent is extended or adjusted under 35 U.S.C. 154(b) by 321 days.

(21) Appl. No.: 12/862,049

(22) Filed: Aug. 24, 2010

(65) Prior Publication Data

US 2011/0064843 A1  Mar. 17, 2011

(30) Foreign Application Priority Data

Sep. 11, 2009 (AT) ................................. A 143/2009

(51) Int. Cl.
*B29C 45/44* (2006.01)

(52) U.S. Cl.
USPC ............................ 425/444; 425/556; 425/577

(58) Field of Classification Search
USPC ......................................... 425/556, 577, 444
See application file for complete search history.

(56) References Cited

U.S. PATENT DOCUMENTS

| | | | | |
|---|---|---|---|---|
| 3,534,443 A | * | 10/1970 | Tucker | 425/443 |
| 3,805,577 A | | 4/1974 | Bergemann et al. | |
| 4,243,620 A | * | 1/1981 | Curetti et al. | 264/45.1 |
| 5,256,364 A | * | 10/1993 | Herbst | 264/334 |
| 5,330,693 A | * | 7/1994 | Takada | 264/106 |
| 5,356,283 A | * | 10/1994 | Hamada et al. | 425/544 |
| 5,385,461 A | * | 1/1995 | Machida | 425/130 |
| 5,718,930 A | * | 2/1998 | Stengel | 425/556 |
| 5,736,079 A | * | 4/1998 | Kamiguchi et al. | 264/40.1 |
| 5,932,164 A | * | 8/1999 | Allen | 264/328.1 |
| 6,042,363 A | * | 3/2000 | Kikuchi | 425/556 |
| 6,533,972 B1 | * | 3/2003 | Stirn | 264/40.5 |
| 6,669,877 B2 | * | 12/2003 | Matsubayashi et al. | 264/40.1 |
| 6,796,787 B2 | * | 9/2004 | Okada | 425/554 |
| 6,837,701 B2 | * | 1/2005 | Becker et al. | 425/556 |
| 7,086,851 B2 | * | 8/2006 | Ickinger et al. | 425/556 |
| 7,124,581 B2 | * | 10/2006 | Dantlgraber | 60/560 |
| 7,168,945 B2 | * | 1/2007 | Chen et al. | 425/577 |
| 7,275,922 B2 | * | 10/2007 | Uchiyama et al. | 425/139 |
| 7,686,607 B2 | * | 3/2010 | Dantlgraber | 425/542 |
| 7,828,540 B2 | * | 11/2010 | Dantlgraber | 425/145 |
| 8,002,532 B2 | * | 8/2011 | Stirn et al. | 425/139 |

(Continued)

FOREIGN PATENT DOCUMENTS

| | | |
|---|---|---|
| DE | 2 351 419 | 5/1974 |
| DE | 102004033102 A1 * | 9/2006 |

(Continued)

*Primary Examiner* — Yogendra Gupta
*Assistant Examiner* — Emmanuel S Luk
(74) *Attorney, Agent, or Firm* — Wendroth, Lind & Ponack, L.L.P.

(57) ABSTRACT

An ejector apparatus for an injection molding machine, includes ejector pins mounted to a movable ejector plate and drivable by a drive device for ejecting injection molded parts from a cavity of an injection molding tool. The ejector plate is displaceable by the drive device with a given normal ejector force acting on an injection molded part. There is provided a reinforcing mechanism which, when there is a jammed injection molded part, reinforces the ejector force acting on the injection molded part to an increased additional ejector force for ejecting the jammed injection molded part above the given normal ejector force which can be or is made available by the drive device.

16 Claims, 6 Drawing Sheets

U.S. PATENT DOCUMENTS

| | | | |
|---|---|---|---|
| 2001/0026032 A1* | 10/2001 | Okada | 264/334 |
| 2002/0056933 A1* | 5/2002 | Kamiguchi et al. | 264/40.1 |
| 2002/0110616 A1* | 8/2002 | Meschia | 425/556 |
| 2003/0086998 A1* | 5/2003 | Banal et al. | 425/556 |
| 2004/0105910 A1* | 6/2004 | Ickinger et al. | 425/556 |
| 2009/0104305 A1* | 4/2009 | Nogueira et al. | 425/556 |

FOREIGN PATENT DOCUMENTS

| | | | |
|---|---|---|---|
| JP | 7-214610 | * | 8/1995 |
| WF | WO2009/079748 | * | 7/2009 |
| WO | 02/40246 | | 5/2002 |
| WO | 02/057062 | | 7/2002 |

* cited by examiner

EJECTOR APPARATUS WITH ADDITIONAL EJECTOR FORCE

BACKGROUND OF THE INVENTION

The invention concerns an ejector apparatus for an injection molding machine, including ejector pins mounted to a movable ejector plate and drivable by a drive device for ejecting injection molded parts from a cavity of an injection molding tool. The ejector plate is displaceable by the drive device with a given normal ejector force acting on an injection molded part.

Apparatuses of that kind serve for the ejection of semi-solidified or entirely solidified injection molding parts from the cavity. Particularly if the injection molded product has portions of an undercut configuration, problems can however arise upon ejection. An example of such injection molded products are screw caps for drink bottles, which have a female screwthread. In order to release them from the negative portion (with a male screwthread) of the injection molding tool, ejector pins strip the injection molded part which has not yet entirely hardened from the one tool half of the injection molding tool. As the plastic material has not yet entirely set, the screw cap widens and can thus be stripped over the negative screwthread of the cavity-forming tool half and thereafter is restored to the original shape.

If delays, interruptions or alterations occur during an injection cycle, however, it the injection molded product can harden to an excessive degree, whereby stripping removal thereof is only possible with greater difficulty, and jamming occurs in the ejection procedure. That results in a stoppage in the ejection operation, which can be released for example by manually turning the jammed injection molded product out. It will be noted, however, that this is a highly time-consuming and ineffective operation.

The object of the invention is to avoid the above-described disadvantages and to provide an ejector apparatus which is more effective and improved over the state of the art.

SUMMARY OF THE INVENTION

The object is attained in that there is provided a reinforcing mechanism which, when there is a jammed injection molded part, reinforces the ejector force acting on the injection molded part to an increased additional ejector force for ejecting the jammed injection molded part above the given normal ejector force which can be or is made available by the drive device. In that way, even when the injection molded part is severely jammed or there is a high level of static friction between the mold and the molded part, the screw cap which is sticking fast in place can be released from the injection molding tool by the additional force applied and only a short (if any) interruption occurs. It is preferably provided that the reinforcing mechanism is designed separately from the drive device.

For that purpose an advantageous embodiment can provide that the additional operating ejector force is at least double the normal ejector force. Preferably the ejector force can be increased from 2 kilonewtons per cavity to about 4 kilonewtons.

A first embodiment of the invention can provide that the drive device has a first operating mode for the normal ejector force and the reinforcing mechanism has an additional motor for a second operating mode. In the second operating mode, the additional motor presses reinforcing plates against the ejector plate preferably by way of an auxiliary spindle. In that case, the switch-over between the individual operating modes can be effected automatically by a detector with suitable control/regulation, or it can be effected manually by an operator.

An advantageous embodiment for that purpose can provide that the additional motor drives by way of a belt transmission two auxiliary spindles which are arranged substantially parallel to a main spindle of the drive device and to which the reinforcing plates are mounted.

A second concrete embodiment of the present invention can provide that the reinforcing mechanism includes a lever arrangement which is connected to the drive device and the ejector plate. By a change in the angular position of the individual levers relative to each other or in the lever arrangement, the lever arrangement reinforces the normal ejector force made available by the drive device to the ejector plate to the additional ejector force. Preferably for that purpose, the lever arrangement is connected pivotably on the one hand to a main spindle driven by the drive device and on the other hand to the ejector plate.

Particularly preferably that can be achieved in that the reinforcing mechanism includes a lever arrangement and a spring which is arranged between the main spindle and the ejector plate and the spring force of which is above the normal ejector force. In the case of a counteracting force which occurs due to a jammed injection molded part and which acts on the ejection movement of the ejector plate, the spacing between the main spindle and the ejector plate is reduced by compression of the spring and the angles of the levers of the lever arrangement relative to each other are displaced whereby the normal ejector force of the ejector plate is reinforced to the additional ejector force for ejecting the jammed injection molded part. In other words, in normal operation, the spring always remains substantially relieved of stress as the normal ejector force of about 2 kilonewtons cannot in any way stress the spring. It is only in the case of a counteracting force which occurs for example due to a jammed injection molded part that the spring is compressed. That results in a change in the angular positioning, whereby a corresponding force transmission effect occurs from the drive device to the ejector plate to increase the ejector force.

Further alternative embodiments can provide, for example, that the ejector apparatus has a transmission mechanism, preferably with racks and gears, which by means of a step-up transmission mechanism apply more ejection force to the ejector plate, starting from the same motor power. For that purpose more force is applied to the ejector plate, with a smaller stroke.

What is common to the three concrete embodiments (additional motor, lever arrangement, transmission step-up) is that the rapid stroke (fast and little force) in the normal mode is different from the force stroke (slow and a great deal of force) in the additional mode.

Protection is also requested for an injection molding machine having an ejector apparatus.

BRIEF DESCRIPTION OF THE DRAWINGS

Further details and advantages of the present invention are described more fully hereinafter by means of the specific description with reference to the embodiments illustrated in the drawings, in which.

DETAILED DESCRIPTION OF THE INVENTION

Figure 1:
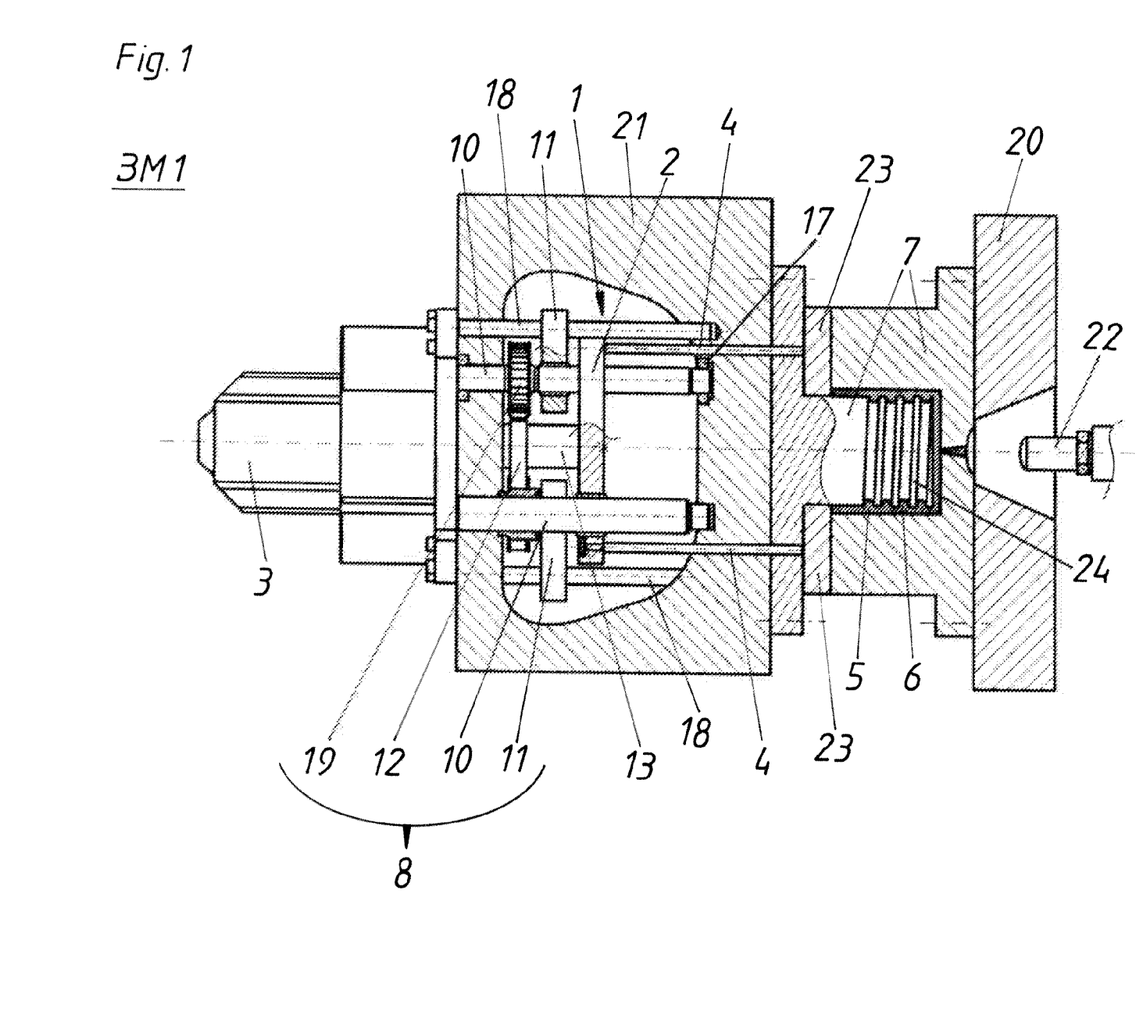
FIG. 1 shows a section through the closing side of an injection molding machine having an ejector apparatus.

FIG. 1 shows the closing side of an injection molding machine having an ejector apparatus 1 in a first operating mode BM1. In general, the closing side of an injection molding machine has the stationary mold mounting plate 20 and the movable mold mounting plate 21 with a two-part injection molding tool 7 arranged therebetween. In that case, provided between the two halves of the injection molding tool 7 is the cavity 6 which in this view is already filled with the molten material which is injected through the injection nozzle 22 and which forms the injection molded part 5.

The ejector apparatus 1 includes the drive device 3 which by way of the spindle 13 drives the ejector plate 2 with a translatory movement. Arranged on that ejector plate 2 are the ejector pins 4 which pass through the movable mold mounting plate 21 and which at their front end have ejector pin extensions 23 which directly engage the injection molded part 5 and upon translatory movement can strip that injection molded part 5 over the screwthread core of the tool half 7. For the additional ejector force Z the ejector apparatus 1 has a reinforcing mechanism 8 which includes an additional motor 9, a belt drive wheel 19, a belt drive 12, two auxiliary spindles 10 and two reinforcing plates 11. In that arrangement, the additional motor 9 can act directly on the belt drive wheel 19 or on one of the two auxiliary spindles 10. The reinforcing plates 11 are guided at rotation-preventing reinforcing plate guides 18. The auxiliary spindles 10 are supported in ball bearings 17 in the movable mold mounting plate 21. The translatory movement of the auxiliary spindles 10 is produced by the spindle nut 26 driven by the belt drive 12.

The left-hand tool half 7 has the negative shape of the female screwthread 25 for the screw cap to be produced in the form of a male screwthread 24, the undercut configurations of which can lead to problems such as, for example, jamming in a stripping operation when stripping off an injection molded product 5 (screw cap) which has cooled or hardened to an excessive degree.

Figure 2:
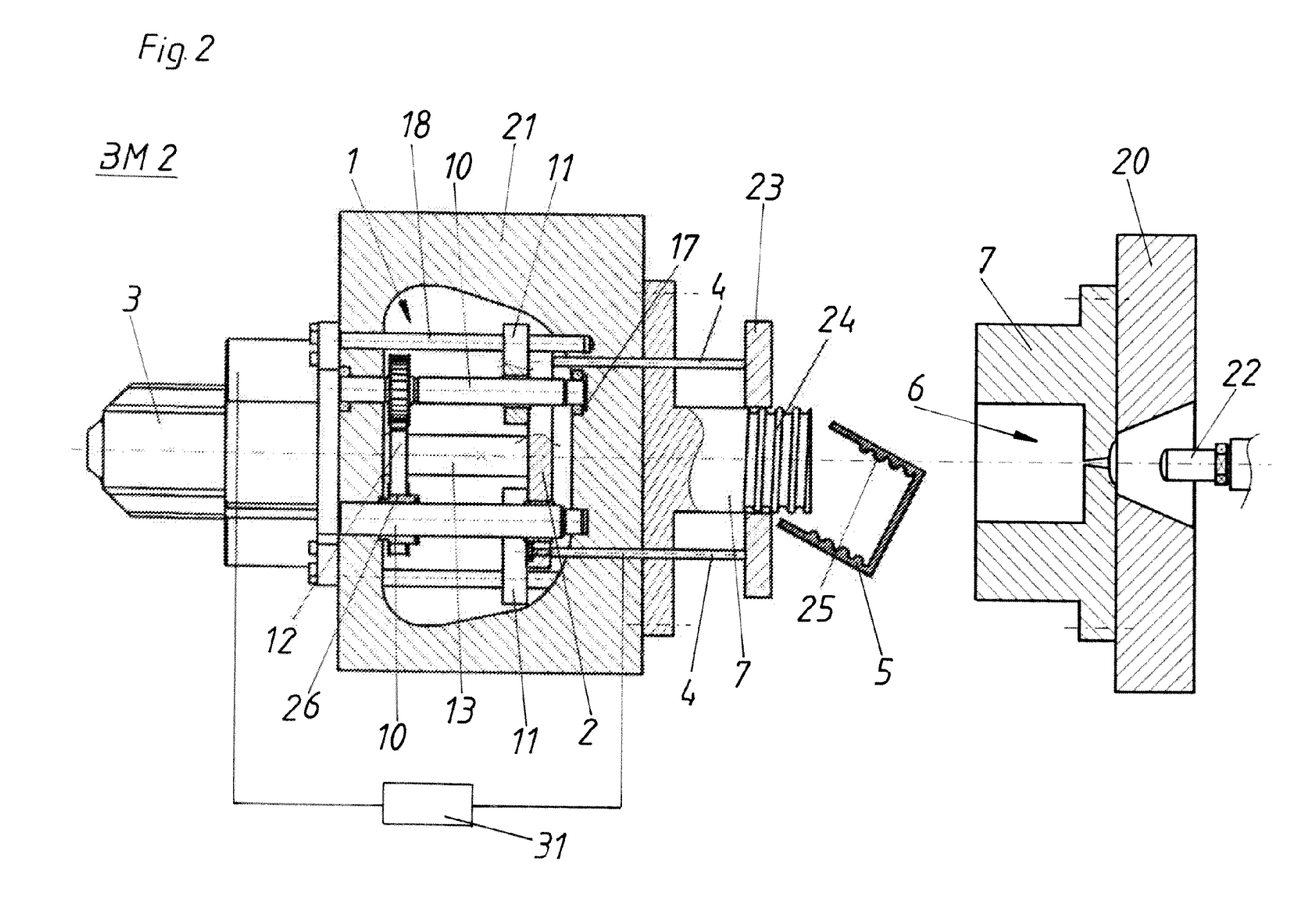
FIG. 2 shows the view of FIG. 1 with the injection molding tool open.

FIG. 2 shows the closing side of an injection molding machine with an ejector apparatus 1 in the second operating mode BM2 in which the above-mentioned jam is releasable. In this case, the reinforcing mechanism 8 is activated (for example after detection of a counteracting force G or jamming by the detector 31), whereby an integrated ejector force Z can be applied to the ejector plate 2 by way of the additional motor 9 and the belt drive wheel 19 and the belt drive 12, by means of the rotating auxiliary spindles 10 and the reinforcing plates 11 guided thereon. The jammed injection molded part 5 can be stripped from the left-hand tool half 7 by a stronger force stroke movement which occurs in the second operating mode BM2, by means of the ejector pins 4 mounted on the ejector plate 2, and the ejector pin extensions 23 thereof. In other words, in that second operating mode BM2, the reinforcing plates/drive bars 11 support the actual ejector plate 2. In that second operating mode BM2, either the motor of the drive device 3 and the additional motor 9 can be switched synchronously or the additional motor 9 alone (in the switched-off standard drive condition of the drive device 3) can exert sufficient additional ejector force Z on the jammed injection molded part 5.

Figure 3:
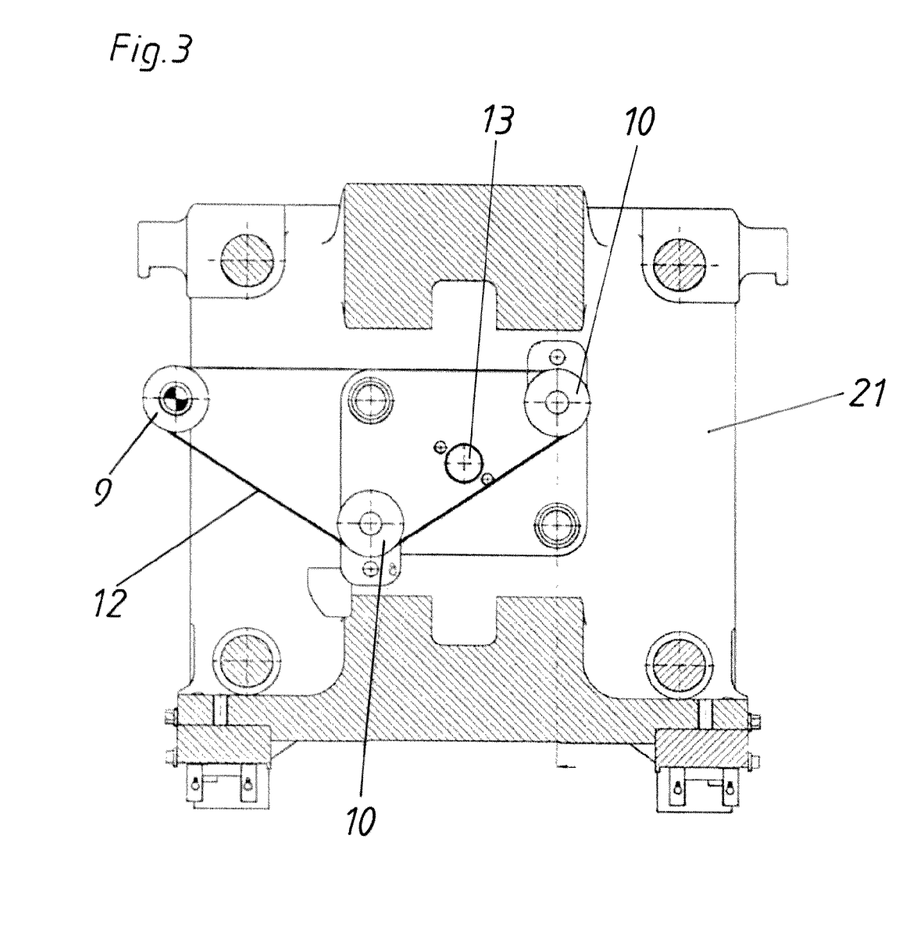
FIG. 3 shows a rear view of the closing side of an injection molding machine with additional motor.

FIG. 3 shows a rear view of the closing side in relation to FIGS. 1 and 2. The additional motor 9 can be seen therein.

Figure 4:
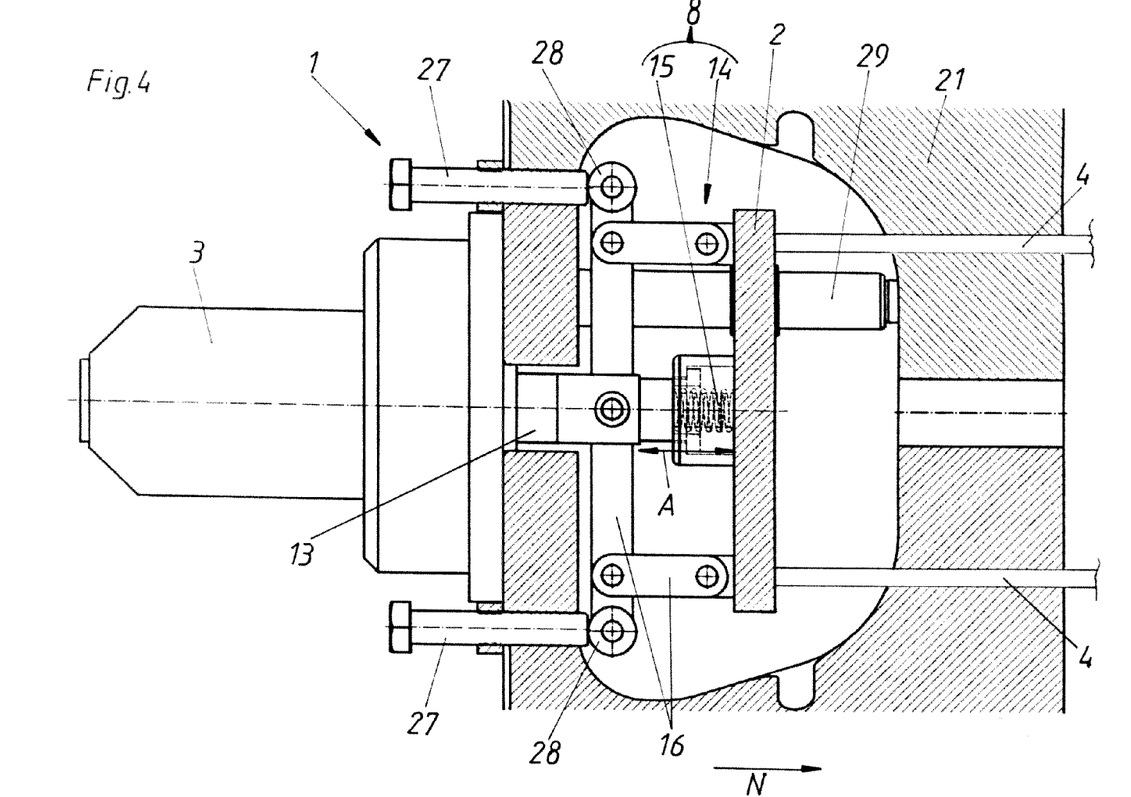
FIG. 4 shows a section through the ejector apparatus with lever arrangement in the normal mode of operation.

FIG. 4 shows the ejector apparatus 1 in the normal mode of operation prior to the ejection of an injection molded part 5 (not shown here) by the ejector pins 4. In this case, the normal ejector force N is sufficient to eject the aforementioned injection molded part 5. In this case, the entire lever arrangement 14 remains in that position. The ejector force is thus transmitted from the drive device 3 to the ejector plate 2 by way of the main spindle 13 and the spring 15 which is biased to the normal ejector force N. In the illustrated starting position, the lever abutments 28 bear against the abutment bolts 27 in the movable mold mounting plate 21.

Figure 5:
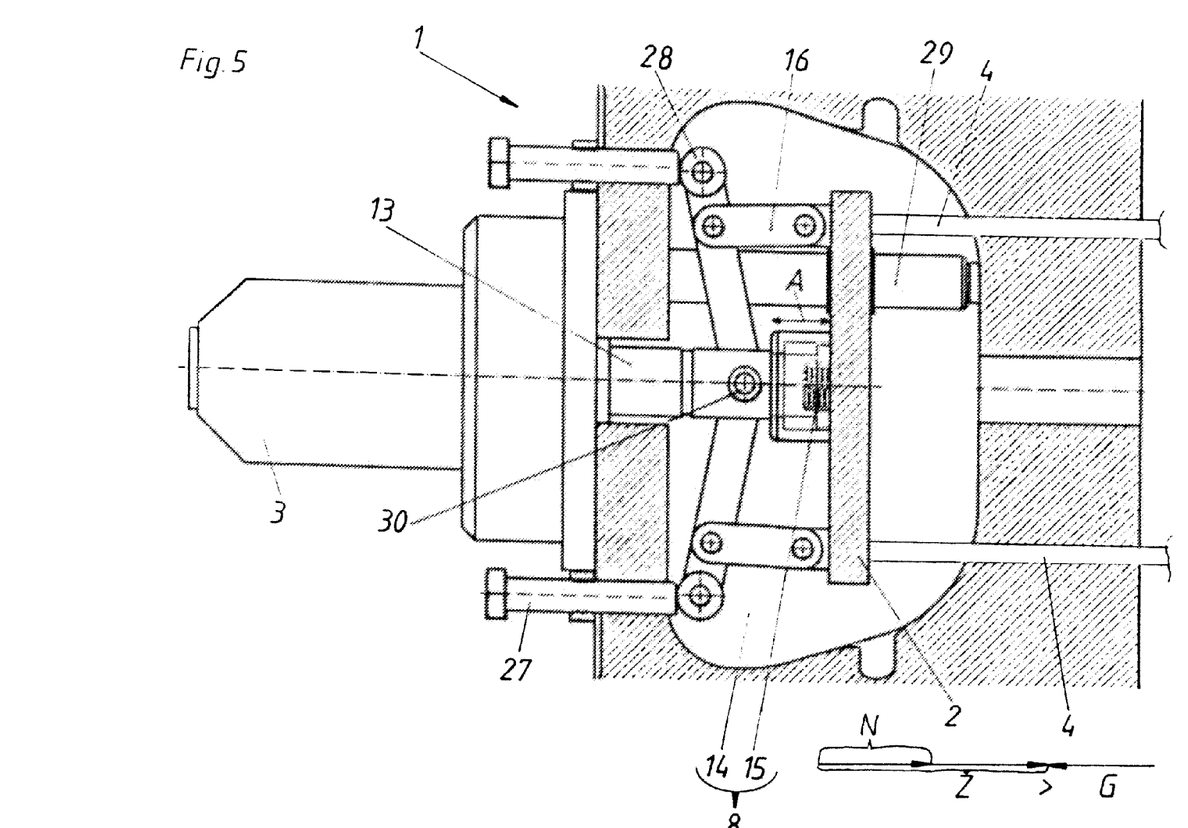
FIG. 5 shows a section through the ejector apparatus with lever arrangement when releasing the jam.

FIG. 5 shows how the lever arrangement 14 and the spring 15 together form the reinforcing mechanism 8. In that case, a counteracting force G (produced by increased static friction between the mold and the molded part) acts on the ejector plate 2 by way of the ejector pins 4, through a jammed injection molded part 5 (not shown here). Now counteracting force G and the normal ejector force N come together in the region of the spring 15 so that spring 15 is compressed, thereby providing for angular displacement of the individual levers 16 of the lever arrangement 14 relative to each other. That can also be seen from the fact that the spacing A between the ejector plate 2 and the main spindle 13 or the main spindle joint 30 thereof is shortened in relation to the spacing A shown in FIG. 4. In that respect, due to the lever action, an increased ejector force Z is generated, which is sufficient to overcome the counteracting force G. Thus, FIG. 5 shows the lever arrangement 14 together just when overcoming the counteracting force G or when releasing the injection molded part 5 from the left-hand injection molding tool 7. In other words, the static friction between the molded part and the mold is overcome.

Figure 6:
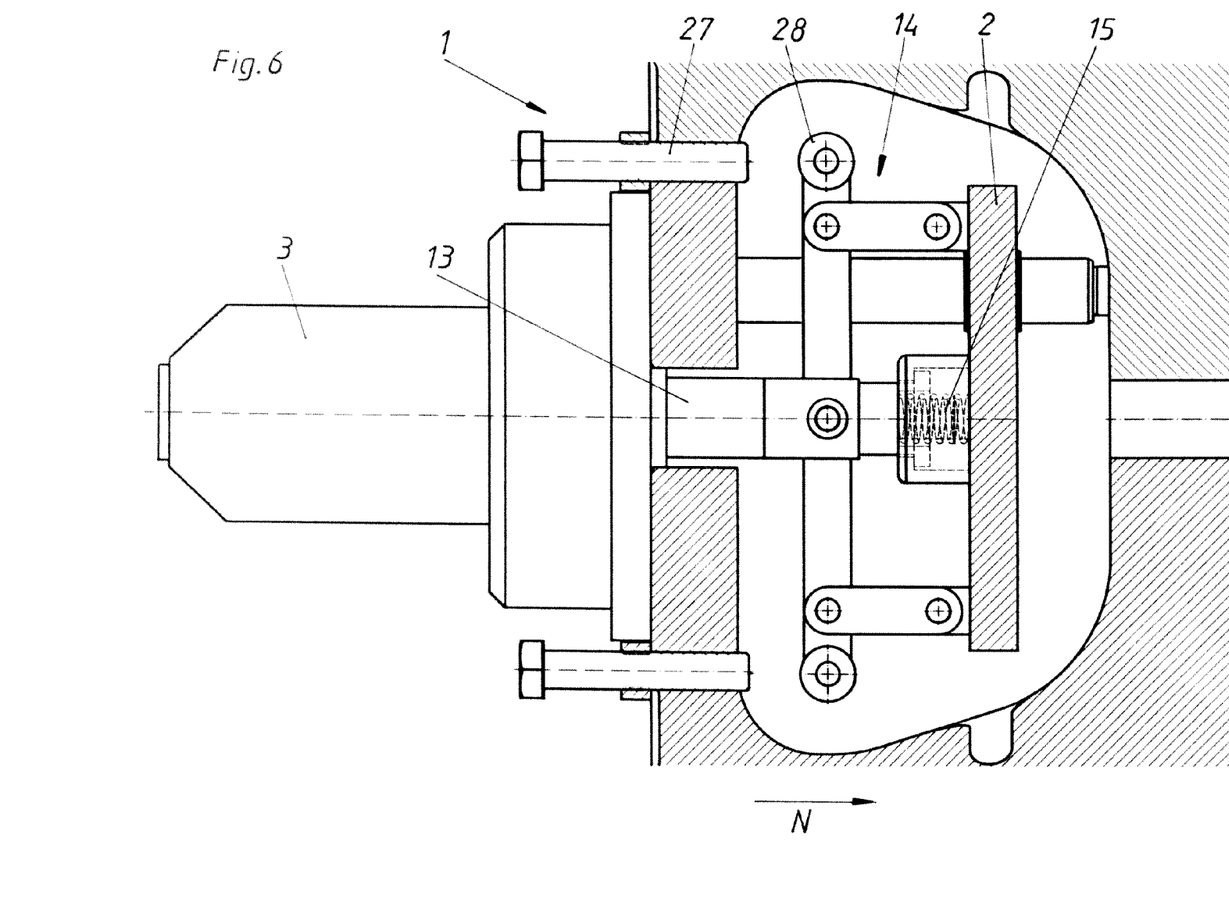
FIG. 6 shows a section through the ejector apparatus after the jam is released.

FIG. 6 then shows the further ejection operation after the molded part has been broken loose/released, wherein the static friction has already become a sliding friction between the molded part and the mold, which can be overcome by the normal ejector force N alone.

That apparatus thus provides an automatic mechanical increase in force in the event of a counteracting force G. The force step-up effect due to the change in the angular positioning of the levers 16 of the lever arrangement 14 relative to each other is sufficient to increase the ejector force in such a way that a jammed injection molded part 15 can be ejected or stripped off.

The invention claimed is:

1. An ejector apparatus for an injection molding machine, comprising:
   ejector pins mounted to a movable ejector plate;
   a drive device for driving said ejector pins to eject injection molded parts from a cavity of an injection molding tool, said drive device being configured to displace said ejector plate with a given normal ejector force acting on an injection molded part; and
   a reinforcing mechanism configured to reinforce the ejector force acting on said injection molded part when an injection molded part becomes jammed so as to generate a greater ejector force greater than the given normal ejector force and thereby eject the jammed injection molded part;
   wherein, in a first operating mode, said drive device generates the normal ejector force, and in a second operating mode, a motor of said reinforcing mechanism presses reinforcing plates against said ejector plate.

2. The ejector apparatus of claim 1, wherein the greater ejector force is at least double the normal ejector force.

3. The ejector apparatus of claim 1, wherein said motor of said reinforcing mechanism presses reinforcing plates against said ejector plate via an auxiliary spindle.

4. The ejector apparatus of claim 1, wherein said motor of said reinforcing mechanism drives two auxiliary spindles via a belt transmission, said auxiliary spindles being arranged substantially parallel to a main spindle of said drive device and being mounted to said reinforcing plates.

5. The ejector apparatus of claim 1, wherein said reinforcing mechanism includes a lever arrangement connected to said drive device and said ejector plate, said lever arrangement being configured such that a change in angular position of individual levers of said lever arrangement relative to each other reinforces the normal ejector force to generate the greater ejector force.

6. The ejector apparatus of claim 5, wherein said lever arrangement is pivotably connected to a main spindle driven by said drive device and to said ejector plate.

7. The ejector apparatus of claim 1, wherein said reinforcing mechanism includes:
  a lever arrangement; and
  a spring arranged between a main spindle driven by said drive device and said ejector plate, a spring force of said spring being set above the normal ejector force;
  wherein, in a case of a counteracting force occurring due to a jammed injection molded part and acting on the ejection movement of said ejector plate, the spacing between said main spindle and said ejector plate is reduced by compression of said spring and angles of levers of said lever arrangement relative to each other are displaced such that the normal ejector force of said ejector plate becomes the greater ejector force for ejecting the jammed injection molded part.

8. An injection molding machine comprising said ejector apparatus of claim 1.

9. An ejector apparatus for an injection molding machine, comprising:
  ejector pins mounted to a movable ejector plate;
  a drive device for driving said ejector pins to eject injection molded parts from a cavity of an injection molding tool, said drive device being configured to displace said ejector plate with a given normal ejector force acting on an injection molded part; and
  a reinforcing mechanism configured to reinforce the ejector force acting on said injection molded part when an injection molded part becomes jammed so as to generate a greater ejector force above the given normal ejector force and thereby eject the jammed injection molded part, said reinforcing mechanism including a motor for pressing reinforcing plates against said ejector plate;
  wherein said motor of said reinforcing mechanism drives two auxiliary spindles via a belt transmission, said auxiliary spindles being arranged substantially parallel to a main spindle of said drive device and being mounted to said reinforcing plates.

10. The ejector apparatus of claim 9, wherein the greater ejector force is at least double the normal ejector force.

11. The ejector apparatus of claim 9, wherein, in a first operating mode, said drive device generates the normal ejector force, and in a second operating mode, said motor of said reinforcing mechanism presses said reinforcing plates against said ejector plate.

12. The ejector apparatus of claim 9, wherein said reinforcing mechanism includes a lever arrangement connected to said drive device and said ejector plate, said lever arrangement being configured such that a change in angular position of individual levers of said lever arrangement relative to each other reinforces the normal ejector force to generate the greater ejector force.

13. The ejector apparatus of claim 12, wherein said lever arrangement is pivotably connected to a main spindle driven by said drive device and to said ejector plate.

14. The ejector apparatus of claim 9, wherein said reinforcing mechanism includes:
  a lever arrangement; and
  a spring arranged between a main spindle driven by said drive device and said ejector plate, a spring force of said spring being set above the normal ejector force;
  wherein, in a case of a counteracting force occurring due to a jammed injection molded part and acting on the ejection movement of said ejector plate, the spacing between said main spindle and said ejector plate is reduced by compression of said spring and angles of levers of said lever arrangement relative to each other are displaced such that the normal ejector force of said ejector plate becomes the greater ejector force for ejecting the jammed injection molded part.

15. An injection molding machine comprising said ejector apparatus of claim 9.

16. An ejector apparatus for an injection molding machine, comprising:
  ejector pins mounted to a movable ejector plate;
  a drive device for driving said ejector pins to eject injection molded parts from a cavity of an injection molding tool, said drive device being configured to displace said ejector plate with a given normal ejector force acting on an injection molded part; and
  a reinforcing mechanism configured to reinforce the ejector force acting on said injection molded part when an injection molded part becomes jammed so as to generate a greater ejector force greater than the given normal ejector force and thereby eject the jammed injection molded part;
  wherein said reinforcing mechanism includes a lever arrangement connected to said drive device and said ejector plate, said lever arrangement being configured such that a change in angular position of individual levers of said lever arrangement relative to each other reinforces the normal ejector force to generate the greater ejector force.

* * * * *

UNITED STATES PATENT AND TRADEMARK OFFICE
CERTIFICATE OF CORRECTION

PATENT NO.       : 8,444,409 B2                               Page 1 of 1
APPLICATION NO.  : 12/862049
DATED            : May 21, 2013
INVENTOR(S)      : Stefan Eppich It is certified that error appears in the above-identified patent and that said Letters Patent is hereby corrected as shown below:

On the Title Page

In item 73, change "Engel Austria GmbH, Schwertberg (AU)" to -- Engel Austria GmbH, Schwertberg (AT) --.

In item 30, change "Sep. 11, 209 (AT)..........................A 143/2009" to
-- Sep. 11, 2009     (AT)..........................A 1437/2009
   Aug. 25, 2009    (AT)..........................A 1335/2009 --.

Signed and Sealed this
Twentieth Day of August, 2013

Teresa Stanek Rea
*Acting Director of the United States Patent and Trademark Office*